US012143459B2

(12) United States Patent
Fields et al.

(10) Patent No.: US 12,143,459 B2
(45) Date of Patent: Nov. 12, 2024

(54) PREDICTIVE RISK PROPENSITY MODEL FOR IMPROVING HIGH RISK DRIVING BEHAVIORS

(71) Applicant: State Farm Mutual Automobile Insurance Company, Bloomington, IL (US)

(72) Inventors: Brian Mark Fields, Normal, IL (US); Stephen R. Prevatt, Normal, IL (US); Steve Roberson, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 17/644,312

(22) Filed: Dec. 14, 2021

(65) Prior Publication Data

US 2022/0109739 A1   Apr. 7, 2022

Related U.S. Application Data

(63) Continuation of application No. 15/724,069, filed on Oct. 3, 2017, now abandoned.

(51) Int. Cl.
*H04L 67/565* (2022.01)
*G06F 16/25* (2019.01)
(Continued)

(52) U.S. Cl.
CPC ........... *H04L 67/565* (2022.05); *G06Q 40/08* (2013.01); *G07C 5/0808* (2013.01);
(Continued)

(58) Field of Classification Search
CPC ..... H04L 67/565; H04L 67/12; H04L 67/306; H04L 67/535; G06Q 40/08; G07C 5/0808;
(Continued)

(56) References Cited

U.S. PATENT DOCUMENTS 9,129,460 B2 * 9/2015 McClellan et al. .... G07C 5/085
9,311,271 B2   4/2016 Wright
(Continued)

FOREIGN PATENT DOCUMENTS

EP   3239686   11/2017
EP   3578433 A1   4/2019
(Continued)

OTHER PUBLICATIONS

Steven C. Craig, Vehicle Telematics: Risk Management at Every Turn, Jun. 1, 2010, Risk Management (Year: 2010).*
(Continued)

*Primary Examiner* — Scott C Anderson
*Assistant Examiner* — George N. Proios
(74) *Attorney, Agent, or Firm* — Lee & Hayes, P.C.

(57) ABSTRACT

Systems and methods for providing an aspirational safe driving incentive to drivers having the propensity or ability to improve high risk driving behaviors are provided. Drivers exhibiting high risk driving behaviors may be identified, and initial vehicle telematics data associated with each of the drivers may be collected and analyzed in order to determine which drivers have propensity or ability to improve their high risk driving behaviors. These candidate drivers may receive a probationary safe driving incentive along with feedback configured to improve the drivers' high risk driving behaviors. Updated vehicle telematics data associated with each candidate driver may be collected in order to evaluate an extent to which each candidate driver has improved his or her high risk driving behaviors. Accordingly, a candidate driver's probationary safe driving incentive may be modified or maintained based on the extent to which the candidate has improved upon high risk driving behaviors.

21 Claims, 4 Drawing Sheets

(51) Int. Cl.
*G06Q 40/08* (2012.01)
*G07C 5/08* (2006.01)
*H04L 41/0213* (2022.01)
*H04L 41/0806* (2022.01)
*H04L 67/12* (2022.01)

(52) U.S. Cl.
CPC ......... *G07C 5/0825* (2013.01); *G07C 5/0833* (2013.01); *G07C 5/0841* (2013.01); *H04L 67/12* (2013.01)

(58) Field of Classification Search
CPC .. G07C 5/0825; G07C 5/0833; G07C 5/0841; G06F 16/258
USPC .......................................................... 705/4
See application file for complete search history.

(56) References Cited

U.S. PATENT DOCUMENTS

| | | | |
|---|---|---|---|
| 9,633,487 B2 | 4/2017 | Wright | |
| 9,830,748 B2 | 11/2017 | Rosenbaum | |
| 9,990,782 B2 | 6/2018 | Rosenbaum | |
| 10,023,114 B2* | 7/2018 | Adams et al. | B60Q 9/00 |
| 10,192,369 B2 | 1/2019 | Wright | |
| 10,198,879 B2* | 2/2019 | Wright | G07C 5/02 701/50 |
| 10,269,190 B2 | 4/2019 | Rosenbaum | |
| 10,467,824 B2 | 11/2019 | Rosenbaum | |
| 10,540,892 B1* | 1/2020 | Fields et al. | G08G 1/096708 |
| 11,227,452 B2 | 1/2022 | Rosenbaum | |
| 11,407,410 B2 | 8/2022 | Rosenbaum | |
| 11,524,707 B2 | 12/2022 | Rosenbaum | |
| 11,594,083 B1 | 2/2023 | Rosenbaum | |
| 2015/0187013 A1* | 7/2015 | Adams et al. | G06Q 40/08 |
| 2016/0357262 A1* | 12/2016 | Ansari | G06F 3/017 |
| 2017/0021764 A1* | 1/2017 | Adams et al. | B60Q 9/00 |
| 2018/0218452 A1* | 8/2018 | Guensler et al. | G06Q 40/08 |
| 2018/0339653 A1* | 11/2018 | Adams et al. | B06Q 9/00 |
| 2019/0100216 A1* | 4/2019 | Volos et al. | B60W 40/09 |
| 2019/0202475 A1* | 7/2019 | Phelan | B60W 50/12 |
| 2022/0048518 A1* | 2/2022 | Chan et al. | B60W 40/08 |
| 2022/0092893 A1 | 3/2022 | Rosenbaum | |
| 2022/0340148 A1 | 10/2022 | Rosenbaum | |
| 2023/0060300 A1 | 3/2023 | Rosenbaum | |

FOREIGN PATENT DOCUMENTS

| | | |
|---|---|---|
| EP | 3730375 A1 | 4/2020 |
| EP | 3960576 A1 | 3/2022 |
| EP | 4190659 | 6/2023 |
| EP | 4190660 A1 | 6/2023 |

OTHER PUBLICATIONS

Craig, "Vehicle Telematics: Risk Management at Every Turn", Jun. 1, 2010, Risk Management, 3 pages, retrieved from <<http://www.rmmagazine.com/2010/06/01/vehicle-telematics-risk-management-at-every-turn/>>.

Office Action for U.S. Appl. No. 15/724,069, mailed on May 12, 2021, Fields, "Predictive Risk Propensity Model for Improving High Risk Driving Behaviors", 15 pages.

Final Office Action dated Oct. 5, 2020 for U.S. Appl. No. 15/724,069, "Predictive Risk Propensity Model for Improving High Risk Driving Behaviors", Fields, 37 pages.

Office Action for U.S. Appl. No. 15/724,069, mailed on Oct. 14, 2021, Fields, "Predictive Risk Propensity Model for Improving High Risk Driving Behaviors", 17 Pages.

Final Office Action dated Dec. 26, 2019 for U.S. Appl. No. 15/724,069 "Predictive Risk Propensity Model for Improving High Risk Driving Behaviors" Fields, 28 pages.

Non Final Office Action dated May 15, 2020 for U.S. Appl. No. 15/724,069 "Predictive Risk Propensity Model for Improving High Risk Driving Behaviors" Fields, 34 pages.

* cited by examiner

PREDICTIVE RISK PROPENSITY MODEL FOR IMPROVING HIGH RISK DRIVING BEHAVIORS

PRIORITY

This application is a continuation of, and claims priority to, U.S. patent application Ser. No. 15/724,069, filed on Oct. 3, 2017, and is fully incorporated by reference herein.

TECHNICAL FIELD

The present disclosure generally relates to improving driver safety, and more particularly to technology for providing an aspirational safe driving incentive to candidate drivers having the propensity or ability to improve high risk driving behaviors.

BACKGROUND

Generally, individuals who drive safely may be eligible for safe driving incentives (e.g., from their insurance providers), while individuals who exhibit high risk driving behaviors may not be eligible for such safe driving incentives. However, some individuals who exhibit high risk driving behaviors, or have exhibited high risk driving behaviors in the past, may have the propensity or ability to improve their driving by changing those behaviors. Unfortunately, due to the absence of technologies specifically directed to the identification or special treatment of such individuals, those individuals may never receive a safe driving incentive, even if they improve their high risk driving behaviors. Lacking incentives to change, such individuals may retain their high risk driving behaviors indefinitely.

SUMMARY

In one aspect, a method is provided for providing an aspirational safe driving incentive to candidate drivers having the propensity or ability to improve high risk driving behaviors. The method may include steps of identifying a plurality of drivers exhibiting high risk driving behaviors, collecting initial vehicle telematics data associated with each of the plurality of drivers exhibiting high risk driving behaviors, and identifying, by analyzing at least the initial vehicle telematics data associated with each of the plurality of drivers exhibiting high risk driving behaviors, one or more candidate drivers, of the plurality of drivers exhibiting high risk driving behaviors, having propensity or ability to improve high risk driving behaviors. Additionally, the method may include steps of providing, to each of the one or more candidate drivers, a probationary safe driving incentive, providing, to each of the one or more candidate drivers, feedback configured to improve high risk driving behaviors of the candidate driver, collecting updated vehicle telematics data associated with each of the one or more candidate drivers, and evaluating, using the updated vehicle telematics data associated with each of the one or more candidate drivers, an extent to which each of the one or more candidate drivers has improved high risk driving behaviors. Furthermore, the method may include a step of modifying or maintaining the probationary safe driving incentive for each of the one or more candidate drivers based on the extent to which each of the one or more candidate drivers has improved high risk driving behaviors.

In another aspect, a computer system is provided for providing an aspirational safe driving incentive to candidate drivers having the propensity or ability to improve high risk driving behaviors. The computer system may include one or more processors and one or more memories. The one or more memories may store instructions that, when executed by the one or more processors, cause the computer system to identify a plurality of drivers exhibiting high risk driving behaviors, collect initial vehicle telematics data associated with each of the plurality of drivers exhibiting high risk driving behaviors, and identify, by analyzing at least the initial vehicle telematics data associated with each of the plurality of drivers exhibiting high risk driving behaviors, one or more candidate drivers, of the plurality of drivers exhibiting high risk driving behaviors, having propensity or ability to improve high risk driving behaviors. Additionally, the one or more memories may store instructions that, when executed by the one or more processors, cause the computer system to provide, to each of the one or more candidate drivers, a probationary safe driving incentive, provide, to each of the one or more candidate drivers, feedback configured to improve high risk driving behaviors of the candidate driver, collect updated vehicle telematics data associated with each of the one or more candidate drivers, and evaluate, using the updated vehicle telematics data associated with each of the one or more candidate drivers, an extent to which each of the one or more candidate drivers has improved high risk driving behaviors. Furthermore, the one or more memories may store instructions that, when executed by the one or more processors, cause the computer system to modify or maintain the probationary safe driving incentive for each of the one or more candidate drivers based on the extent to which each of the one or more candidate drivers has improved high risk driving behaviors.

DETAILED DESCRIPTION

Figure 1:
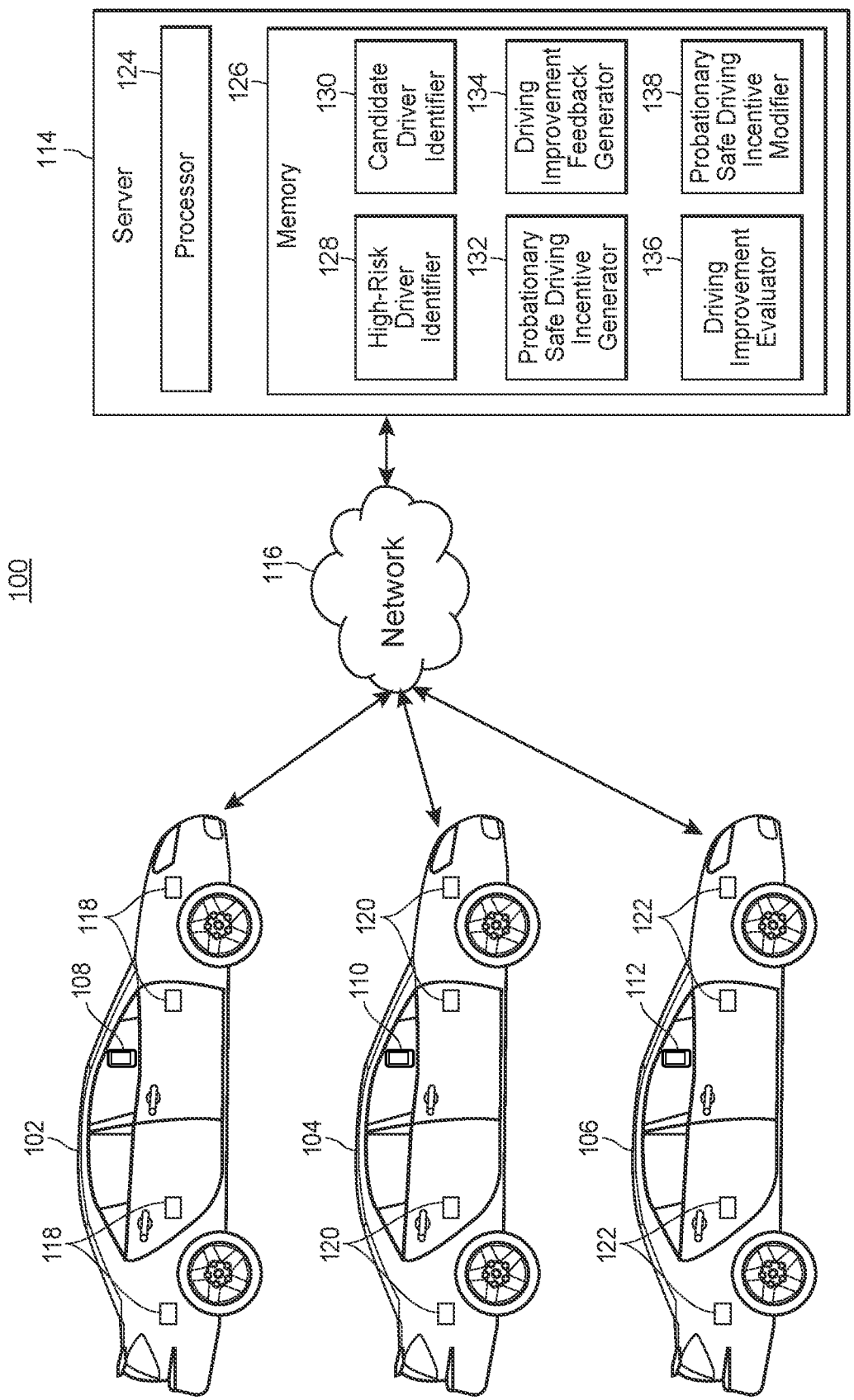
FIG. 1 depicts an exemplary system for providing an aspirational safe driving incentive to candidate drivers having the propensity or ability to improve their high risk driving behaviors.

The present embodiments may relate to, inter alia, technology for providing an aspirational safe driving incentive to candidate drivers having the propensity or ability to improve their high risk driving behaviors. According to certain aspects, systems and methods may identify drivers who exhibit high risk driving behaviors and, based on an analysis of telematics data associated with the drivers and/or personality traits of the drivers, identify those of the drivers who are most likely to improve their high risk driving behaviors as candidates for an aspirational safe driving incentive. The aspirational safe driving incentive may initially be provided on a probationary basis (hereinafter referred to as the "probationary safe driving incentive"), but upon actual improvement of high risk driving behaviors, may be provided indefinitely. Along with the probationary safe driving incentive, the candidate drivers may receive feedback (e.g., training, advice, etc.) configured to help them to improve their high risk driving behaviors. Vehicle telematics data associated with each candidate driver may consequently be evaluated to determine the extent to which each candidate driver has improved his or her high risk driving behaviors (e.g., since receiving the feedback). Based on the extent to which each candidate driver has improved his or her high risk driving behaviors, the probationary safe driving incentive may be maintained or modified accordingly.

Such a technique may offer numerous benefits as compared with current technology. In particular, the systems and methods discussed herein address the challenge of incentivizing drivers who have the propensity or ability to improve their high risk driving behaviors to actually improve such behaviors. Incentives for drivers who already drive safely are well known, but drivers who have exhibited high risk driving behaviors in the past are often barred from such incentives due to poor driving records. That is, there is generally little motivation for a provider of such incentives (e.g., an insurance provider) to provide a safe driving incentive to a driver with a poor driving record, because the provider has no way to know whether the driver will improve his or her driving behaviors or continue to exhibit high risk driving behaviors. Moreover, even for drivers having the propensity or ability to improve such high risk driving behaviors, there is generally no direct financial incentive to actually make such improvements. Lacking incentives to change, such individuals may retain their high risk driving behaviors indefinitely. As a result, using current practices, insurance providers may fail to capture a segment of potentially profitable customers: drivers exhibiting high risk driving behaviors but having the propensity or ability to change such behaviors.

The systems and methods described herein offer improved capabilities to solve these problems, including by utilizing vehicle telematics data associated with drivers who exhibit high risk driving behaviors to determine which of these drivers have the propensity or ability to improve their high risk driving behaviors. For example, using sensors disposed at vehicles associated with drivers who exhibit high risk driving behaviors, various types of vehicle telematics data may be captured. The captured vehicle telematics data may be analyzed, and based on the types of high risk driving behaviors associated with the driver, and/or based on the patterns of those behaviors (e.g., variability or consistency of high risk driving behaviors, frequency of certain driving behaviors, etc.), a determination may be made as to whether the driver has a higher or lower potential to improve. Additionally, personality tests, assessments, surveys, and/or questionnaires may be provided to drivers who exhibit high risk driving behaviors in order to determine whether these drivers have personality traits indicative of the propensity or ability to improve high risk driving behaviors.

For those drivers with a higher potential to improve their high risk driving behaviors, a probationary safe driving incentive may be provided, e.g., for a set period of time. Over that period of time, feedback configured to help the driver improve his or her high risk driving behaviors may also be provided to the driver. By comparing initial vehicle telematics data to vehicle telematics data collected over the period of time, the extent of any driving behavior improvements over the period of time may be determined, and the probationary safe driving incentive may be maintained or modified based on the extent of the improvements. In this way, the probationary safe driving incentive is tied to actual improvements made by the drivers, and accordingly incentivizes such actual improvements.

FIG. 1 depicts an exemplary system 100 for providing an aspirational safe driving incentive to candidate drivers having the propensity or ability to improve high risk driving behaviors. The high-level architecture illustrated in FIG. 1 may include both hardware and software applications, as well as various data communications channels for communicating data between the various hardware and software components, as is described below. The system 100 may include vehicles 102, 104, 106, which may be any types of vehicles, such as automobiles, motorcycles, boats, jet-skis, snowmobiles, etc. Of course, while FIG. 1 depicts three vehicles 102, 104, 106, there may be any number of vehicles (e.g., as few as one vehicle, or more than three vehicles, etc.). Mobile devices and/or on-board computers 108, 110, 112, may be disposed, temporarily or permanently, in each of the vehicles 102, 104, 106. The mobile devices and/or on-board computers 108, 110, 112 may be any types of suitable mobile devices or on-board computers, such as mobile phones, smart phones, smart watches, wearable electronics, dedicated mobile devices or on-board computers for providing an aspirational safe driving incentive to candidate drivers having the propensity or ability to improve high risk driving behaviors, etc. Furthermore, the mobile devices and/or on-board computers 108, 110, 112 may include displays, audio capabilities, haptic feedback capabilities, and/or any other suitable means for providing notifications, alerts, feedback, etc. to drivers. Moreover, the mobile devices and/or on-board computers 108, 110, 112 may be configured to communicate with a server 114 via a network 116, which may be a wireless network, or which may include a combination of wireless and wired networks.

Additionally, the vehicles 102, 104, 106 may respectively include sensors 118, 120, and 122. The sensors 118, 120, 122 may be disposed internally or externally with respect to each vehicle 102, 104, 106 and may be in communication with the mobile devices and/or onboard computers 108, 110, 112. Alternatively, some or all of the sensors 118, 120, 122 may be disposed within the mobile devices and/or onboard computers 108, 110, 112.

The sensors 118, 120, 122 may be configured to capture vehicle telematics data associated with the driver of the vehicle 102, 104, 106 at which the sensors 118, 120, 122 are disposed. In particular, the sensors 118, 120, 122 may be configured to capture vehicle telematics data indicative of driver behavior patterns, e.g., data related to a driver's driving speed, driving acceleration, braking, cornering, following distance, etc. The sensors 118, 120, and 122 may include, for instance, GPS sensors, accelerometers, speedometers, brake sensors, image sensors (e.g., cameras, lidar, or radar), and/or any other sensors suitable for capturing vehicle telematics data indicative of driver behavior patterns.

For example, image sensors may capture vehicle telematics data indicative of a driver's following distance (e.g., by detecting the distance between the vehicle 102, 104 or 106 and another vehicle ahead of the vehicle 102, 104 or 106). As another example, an accelerometer may capture vehicle telematics data indicative of a driver's acceleration or cornering patterns. As still another example, a speedometer may capture vehicle telematics data indicative of a driver's speed. In some instances, additional or alternative sensors 118, 120, 122 may be configured to capture vehicle telematics data indicative of additional or alternative driver behaviors.

Data captured by the sensors 118, 120, 122 may be transmitted to the server 114 via the network 116. The server 114 may in some instances be a collection of multiple co-located or geographically distributed servers, etc., and may include a processor 124 and a memory 126. The processor 124 may in some embodiments include multiple processors, and may be configured to execute any of the various software applications residing on the memory 126. Moreover, the memory 126 may include multiple memories, which may be implemented as semiconductor memories, magnetically readable memories, optically readable memories, biologically readable memories, and/or any other suitable type(s) of non-transitory, computer-readable storage media.

In the embodiment of FIG. 1, the memory 126 stores a high risk driver identifier 128, a candidate driver identifier 130, a probationary safe driving incentive generator 132, a driving improvement feedback generator 134, a driving improvement evaluator 136, and a probationary safe driving incentive modifier 138.

Generally, the high risk driver identifier 128 may identify a plurality of drivers exhibiting high risk driving behaviors (e.g., driving faster than posted speed limits, failing to maintain a safe following distance, unsafe braking or cornering, excessive acceleration, inattentive or otherwise distracted driving, etc.). In some instances, the high risk driver identifier 128 may identify the plurality of drivers exhibiting high risk driving behaviors by analyzing vehicle telematics data captured by the sensors 118, 120, 122 for indications of high risk driving behaviors. As another example, the high risk driver identifier 128 may instead, or also, identify the drivers exhibiting high risk driving behaviors by analyzing historical driving records associated with each of the plurality of drivers. For instance, a driving record including one or more vehicular accidents, speeding tickets, or other traffic violations may indicate that the associated driver likely exhibits high risk driving behaviors.

The candidate driver identifier 130 may identify, from among the high risk drivers, one or more candidate drivers having the propensity or ability to improve high risk driving behaviors. "Propensity or ability," as used herein, may in some instances mean both propensity (e.g., willingness, desire, etc.) and ability. Identifying the one or more candidate drivers may include, for example, analyzing vehicle telematics data associated with the drivers exhibiting high risk driving behaviors. For example, in some instances, drivers exhibiting more consistent high risk driving behaviors may have a greater propensity or ability to improve their high risk driving behaviors than drivers exhibiting highly variable or inconsistent high risk driving behaviors. For instance, a driver who consistently drives over speed limits by a consistent amount (e.g., 20 mph over speed limits) may have a high propensity or ability to change this high risk behavior (e.g., by adjusting driving speed accordingly). Accordingly, the candidate driver identifier 130 may analyze vehicle telematics data associated with the high risk drivers to determine the consistency or variability of each driver's high risk driving behavior. Additionally or alternatively, drivers having certain personality types or dispositions may have a higher propensity or ability to improve their high risk driving behaviors than others. For instance, drivers who respond well to constructive feedback, drivers who are highly adaptable, etc., may have a greater propensity or ability to improve their high risk driving behaviors than other drivers. Consequently, the candidate driver identifier 130 may, for instance, analyze the results of personality tests, assessments, surveys, questionnaires, etc. provided to the plurality of drivers exhibiting high risk driving behaviors in order to determine which of the drivers have personality types or dispositions indicative of a propensity or ability to improve their high risk driving behaviors. Of course, the candidate driver identifier 130 may also utilize other techniques to identify candidate drivers having the propensity or ability to improve high risk driving behaviors.

The probationary safe driving incentive generator 132 may generate a probationary safe driving incentive (e.g., an insurance discount) for each candidate driver. For instance, the probationary safe driving incentive generator 132 may calculate a discount to be applied to a driver's existing insurance policy, or to be offered to a driver if the driver is not yet a customer. For example, the discount may be a percentage reduction of a base policy cost. In some instances, the amount of the discount may be based on the extent to which the driver may be predicted to improve. For example, a greater discount may be generated for a driver exhibiting highly consistent high risk driving behaviors and/or many personality traits indicative of the driver's propensity or ability to improve his or her high risk driving behaviors, as compared with a driver exhibiting somewhat consistent high risk driving behaviors and/or a few personality traits indicative of the driver's propensity or ability to improve.

The driving improvement feedback generator 134 may generate feedback configured to improve each candidate driver's high risk driving behaviors. In some instances, the driving improvement feedback generator 134 may generate general feedback, such as training and/or instructions related to traffic laws and/or vehicle safety. Additionally or alternatively, the driving improvement feedback generator 134 may generate feedback specifically to address the high risk driving behaviors exhibited by the driver. The driving improvement feedback generator 134 may, for instance, generate an indication (e.g., a notification) of specific high risk driving behaviors upon which the driver should improve, e.g., the driver may need to decrease his or her driving speed. In some instances, the driving improvement feedback generator 134 may generate feedback indicating a driving behavior modification course to be completed by the driver. In particular, the driver's probationary safe driving incentive may be contingent on his or her completion of the driving behavior modification course (e.g., within a certain period of time).

Additionally, in some instances, the driving improvement feedback generator 134 may generate feedback for a particular candidate driver based on the personality or characteristics of the candidate driver (e.g., as indicated by the results of personality tests, assessments, surveys, questionnaires, etc. provided to each of the plurality of drivers exhibiting high risk driving behaviors). For instance, certain types of feedback may be more effective for certain personality types.

In some embodiments, the driving improvement feedback generator 134 may generate feedback periodically. Moreover, in some instances, the driving improvement feedback generator 134 may generate feedback based on real-time vehicle telematics data. For instance, the feedback generator 134 may analyze vehicle telematics data captured by the sensors 118, 120, 122 to determine that a driver's speed is currently above a posted speed limit. Accordingly, the feedback generator 134 may generate a recommendation that the driver should reduce his or her speed.

Additionally, the driving improvement feedback generator 134 may analyze the vehicle telematics data captured by the sensors 118, 120, 122 to generate statistical feedback related to the driver's high risk driving behaviors. For example, the driving improvement feedback generator 134 may calculate average miles per hour over posted speed limits, number of times the driver has exceeded posted speed limits, average following distance of the driver compared to safe following distance, percentage of safe drives versus unsafe drives, etc., and may generate feedback (e.g., a notification to be displayed to the driver) related to these statistics.

Furthermore, the driving improvement feedback generator 134 may analyze the vehicle telematics data captured by the sensors 118, 120, 122 to generate safe driving goals or objectives for the driver. The safe driving goal or objective may include a time period in which the goal or objective should be reached and/or completed (e.g., one week, one month, one year, etc.) The time period may in some instances be related to the time period during which the driver will be provided with the probationary safe driving incentive (e.g., the driver may maintain the probationary safe driving incentive if he achieves the safe driving goal within the time period).

The driving improvement evaluator 136 may, for each candidate driver, compare initial vehicle telematics data to vehicle telematics data collected while the probationary safe driving incentive is provided in order to determine the extent to which the candidate driver has improved his or her high risk driving behaviors. In some instances, the driving improvement evaluator 136 may evaluate any improvements generally (e.g., by analyzing how many of the driver's high risk driving behaviors have improved over a period of time, and/or how much each of the driver's high risk driving behaviors have improved over a period of time). Additionally, the driving improvement evaluator 136 may evaluate driver improvements based on the completion of any driving behavior modification courses indicated by the feedback generator 134 (e.g., by evaluating whether the driver has completed the driving behavior modification course within a given period of time). In other instances, the driving improvement evaluator 136 may evaluate driver improvements based on safe driving goals or objectives included in the driver feedback (e.g., by evaluating whether a driver has achieved and/or completed a safe driving goal and/or objective during the period of time, or by evaluating the extent to which a driver missed achieving and/or completing the safe driving goal and/or objective). In still other instances, the driving improvement evaluator 136 may evaluate driver improvements compared to the improvements of other similarly situated drivers (e.g., by evaluating whether the driver has improved more or less than other drivers over a similar time period).

The probationary safe driving incentive modifier 138 may determine whether the probationary safe driving incentive for each candidate driver should be maintained or modified based on the extent to which each candidate driver has improved his or her high risk driving behaviors. For instance, if the candidate driver has improved his or her high risk driving behaviors (e.g., generally, or by completing a driving behavior modification course, or by completing a safe driving goal, or compared to other drivers, etc.), the probationary safe driving incentive modifier 138 may maintain (or, in some embodiments or instances, increase) the probationary safe driving incentive. On the other hand, if the driver has not improved his or her high risk driving behaviors, the probationary safe driving incentive modifier 138 may modify (e.g., reduce) the probationary safe driving incentive. In some instances, the probationary safe driving incentive modifier 138 may modify the probationary safe driving incentive based on the extent of improvements.

Of course, this is not an exhaustive list of the applications that may be stored in the memory 126, and various embodiments and configurations may include additional, fewer, and/or alternative applications.

Figure 2:
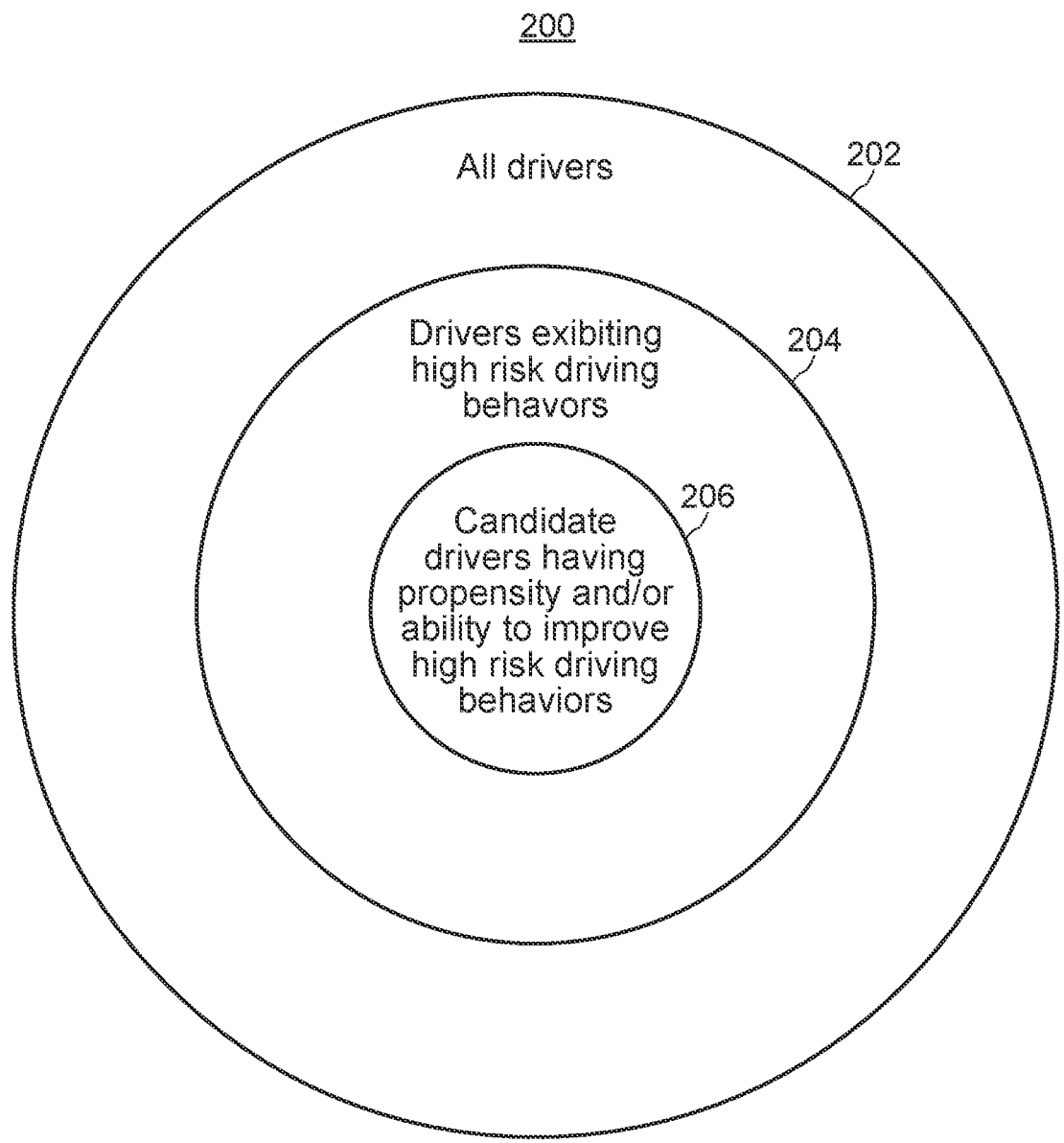
FIG. 2 depicts an exemplary diagram for identifying, from among a plurality of drivers exhibiting high risk driving behaviors, candidate drivers having the propensity or ability to improve their high risk driving behaviors.

FIG. 2 depicts an exemplary diagram 200 for identifying, from a plurality of drivers exhibiting high risk driving behaviors, candidate drivers having the propensity or ability to improve their high risk driving behaviors. Diagram 200 is described herein to illustrate one particular context in which the system 100 (and the corresponding techniques) may be useful. From the general pool of all drivers (202), some drivers may exhibit high risk driving behaviors (204). As discussed with respect to FIG. 1, drivers exhibiting high risk driving behaviors 204 may be identified by, for instance, the high risk driver identifier 128. The high risk driving behaviors associated with drivers 204 may include behaviors such as, for instance, frequently driving at speeds greater than posted speed limits, frequently failing to maintain a safe following distance, frequent unsafe braking or cornering, frequent excessive acceleration, and/or frequent inattentive or otherwise distracted driving. Of course, this is not an exhaustive list of high risk driving behaviors, which may include any type of dangerous, risky, and/or unsafe driving.

Among the drivers exhibiting high risk driving behaviors (204), there may be some high risk drivers having the propensity or ability to improve their high risk driving behaviors, i.e., "candidate drivers" (206). As discussed with respect to FIG. 1, candidate drivers may be identified by, for instance, the candidate driver identifier 130. As one example, a given driver's propensity or ability to improve his or her high risk driving behaviors may be based on the particular high risk driving behaviors exhibited by the driver. For instance, a driver who exhibits a small number of high risk driving behaviors but otherwise drives well may be able to easily fix the small number of high risk driving behaviors in order to become an overall safer driver, and therefore may be a candidate for an aspirational safe driving incentive due to an ability to improve. Additionally or alternatively, a driver who consistently exhibits certain high risk driving behaviors may be more able to improve than a driver who exhibits high risk driving behaviors in an erratic or highly variable way, and may be a candidate for an aspirational safe driving incentive due to an ability to improve high risk driving behaviors in response to feedback. As another example, a driver's propensity or ability to improve his or her high risk driving behaviors may be based on certain personality traits or characteristics of the driver. For instance, a high risk driver who exhibits certain personality traits such as, e.g., a willingness to improve, an ability to accept constructive criticism, high adaptability, etc., may be a candidate for an aspirational safe driving incentive due to his or her propensity or ability to improve high risk driving behaviors in response to feedback.

Accordingly, these high risk drivers having the propensity or ability to improve their high risk driving behaviors may be candidate drivers (206) for an aspirational safe driving incentive. As disclosed herein, an aspirational safe driving incentive may be provided to such candidate drivers in some instances. The aspirational safe driving incentive may initially be provided on a probationary basis, but upon actual improvement of high risk driving behaviors, may be provided indefinitely.

Figure 3:
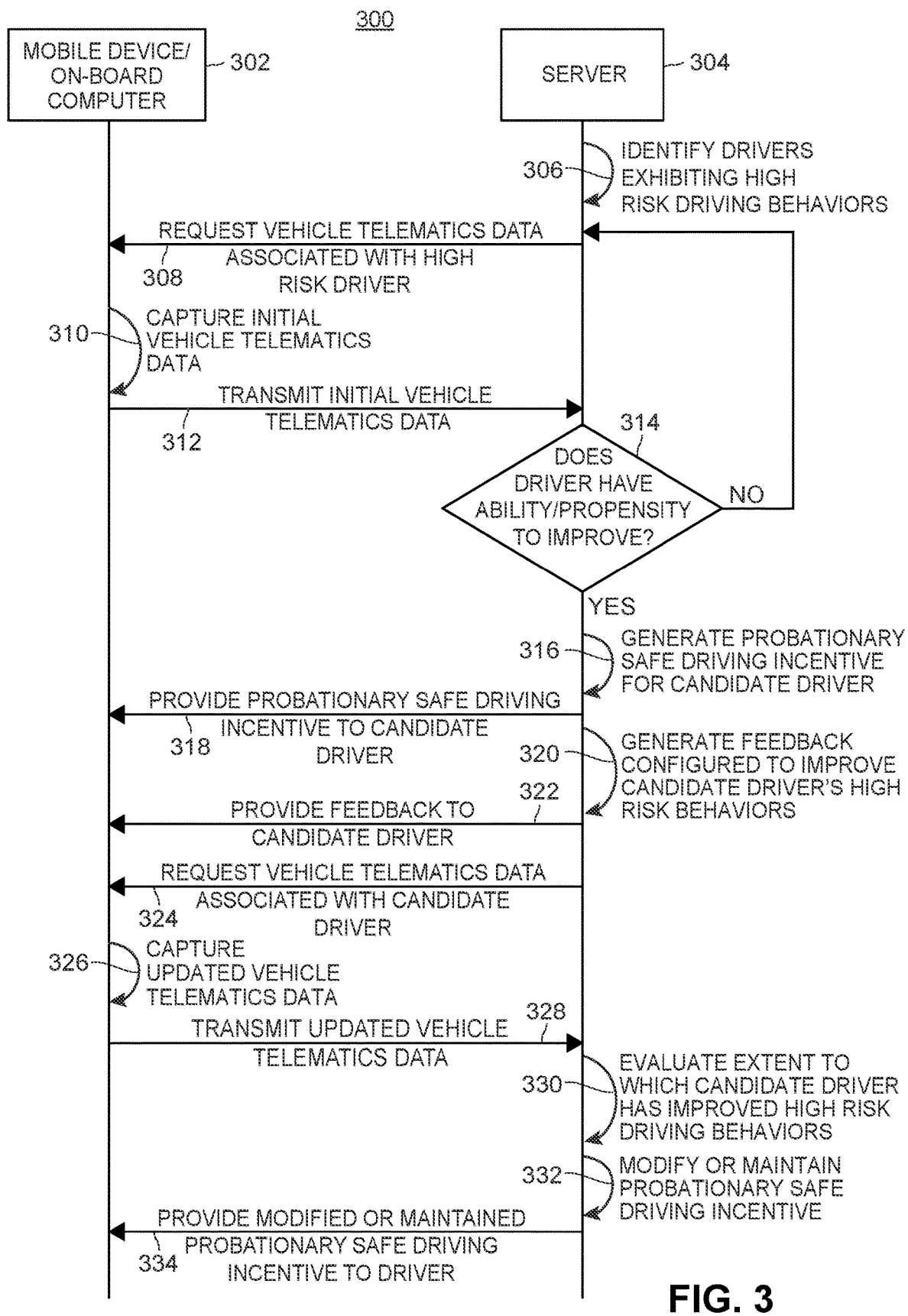
FIG. 3 depicts an exemplary sequence in which an aspirational safe driving incentive may be provided to a candidate driver having the propensity or ability to improve his or her high risk driving behaviors.

FIG. 3 depicts an exemplary sequence 300 in which an aspirational safe driving incentive is provided to a candidate driver having the propensity or ability to improve his or her high risk driving behaviors. The sequence 300 depicts the actions of a mobile device and/or on-board computer 302 (e.g., mobile devices and/or on-board computers 108, 110, 112 of FIG. 1) and a server 304 (e.g., server 114 of FIG. 1). It should be appreciated that additional or alternative actions, and/or actions performed by additional or alternative components and/or devices, are also envisioned.

The sequence 300 may begin when the server 304 identifies (306) drivers exhibiting high risk driving behaviors. High risk driving behaviors may include, for instance, driving faster than posted speed limits, failing to maintain a safe following distance, unsafe braking or cornering, excessive acceleration, inattentive or otherwise distracted driving, etc. In some instances, the server 304 may identify the plurality of drivers exhibiting high risk driving behaviors by analyzing historical vehicle telematics data associated with each of the plurality of drivers for indications of high risk driving behaviors. As another example, the server 304 may identify the drivers exhibiting high risk driving behaviors by analyzing driving records associated with each of the plurality of drivers. For instance, a driving record including one or more vehicular accidents, speeding tickets, or other traffic violations may indicate that the associated driver likely exhibits high risk driving behaviors.

The server 304 may then request (308) vehicle telematics data from a mobile device and/or on-board computer 302 associated with a driver exhibiting high risk driving behaviors. In response to the request, the mobile device and/or on-board computer 302 may capture (310) initial vehicle telematics data (e.g., using sensors such as sensors 118, 120 or 122 shown in FIG. 1) associated with the driver exhibiting high risk driving behaviors, and transmit (312) the initial vehicle telematics data to the server 304. Generally, the vehicle telematics data may include, for example, data related to one or more driving behaviors associated with the driver, such as, e.g., driving speed, driving acceleration, braking, cornering, following distance, and/or attentiveness.

By analyzing the initial vehicle telematics data, the server 304 may determine (314) whether the driver has the propensity or ability to improve his or her high risk driving behaviors. In some instances, determining whether drivers have the propensity or ability to improve high risk driving behaviors may include analyzing the high risk driving behaviors for indications of consistency. That is, in some instances, drivers may be more likely to improve consistent high risk driving behaviors than inconsistent high risk driving behaviors. As another example, determining whether drivers have the propensity or ability to improve high risk driving behaviors may include analyzing the high risk driving behaviors to determine the number or extent of the high risk driving behaviors. That is, drivers may be more likely to improve a smaller number of high risk driving behaviors or less severe high risk driving behaviors, as opposed to a larger number of high risk driving behaviors or more severe high risk driving behaviors. Additionally or alternatively, determining whether a high-risk driver has a propensity or ability to improve high risk driving behaviors may include analyzing personality traits or other characteristics of the driver to determine whether the driver will be likely to be willing to improve such behaviors. The server 304 may determine and/or infer such personality traits or other characteristics of the driver, e.g., from personality tests, assessments, surveys, questionnaires, etc. provided to the driver, from sensor data associated with the driver, and/or any other suitable means. Of course, these are just a few examples, and in some embodiments, the server 304 may determine whether the driver has the propensity or ability to improve his or her high risk driving behaviors in additional or alternative ways.

If the server 304 determines that the driver likely does not have the propensity or ability to improve his or her high risk driving behaviors (314, NO), the sequence may proceed with other functionalities (e.g., requesting vehicle telematics data associated with other drivers exhibiting high risk driving behaviors). If the server 304 determines that the driver likely has the propensity or ability to improve his or her high risk driving behaviors (314, YES), the driver may be considered a candidate driver for a probationary safe driving incentive (i.e., an aspirational safe driving incentive provided on a probationary basis). Consequently, the server 304 may generate (316) a probationary safe driving incentive for the candidate driver and provide (318) the probationary safe driving incentive to the candidate driver, e.g., by transmitting an indication of the probationary safe driving incentive to the mobile device and/or onboard computer 302 associated with the driver. The application executing on the mobile device and/or on-board computer 302 may receive the indication of the probationary safe driving incentive, for example, and cause a display screen of the mobile device 302 to show the driver a notification of the probationary safe driving incentive. Alternatively, the server 304 may send the message describing the probationary safe driving incentive (e.g., a text or email message), or notify the driver that he or she has received a probationary safe driving incentive in another suitable manner.

Additionally, the server 304 may generate (320) feedback configured to improve the candidate driver's high risk driving behaviors. The feedback may include general feedback, such as training and/or instructions related to traffic laws and/or vehicle safety, and/or may include specific feedback tailored to the particular high risk driving behaviors exhibited by the driver. The feedback may include, for instance, an indication of specific high risk driving behaviors upon which the driver should improve. For example, the feedback may indicate that the driver needs to improve his or her cornering behaviors. In some instances, the feedback may include an indication of a driving behavior modification course to be completed by the driver. In particular, the probationary safe driving incentive may be contingent on the completion of the course (e.g., within a certain period of time).

In some embodiments, the feedback for a particular candidate driver may be based on the results of one or more assessments provided to each of the plurality of drivers exhibiting high risk driving behaviors. For instance, certain types of feedback may be more effective for certain personality types, so the feedback may be based on a personality type of the candidate driver, as indicated by, e.g., a personality test, assessment, survey, and/or questionnaire provided to the driver. Moreover, in some instances, the feedback may be based on real-time vehicle telematics data. For instance, a recommendation that the driver corner less sharply may be triggered by an indication that a turn is coming up on the driver's route (for instance, as determined by a vehicle navigation system).

Additionally, the feedback may include statistics related to the driver's high risk driving behaviors as indicated by the initial telematics data (e.g., average miles per hour over posted speed limits, number of times the driver has exceeded posted speed limits, average following distance of the driver compared to safe following distance, percentage of safe drives versus unsafe drives, etc.) Furthermore, the feedback may include one or more safe driving goals or objectives for the driver. For example, a safe driving goal or objective may be reducing the driver's average miles per hour over posted speed limits, or completing a certain training course. A safe driving goal or objective may additionally include a time period in which the goal or objective should be reached and/or completed (e.g., one week, one month, one year, etc.) The time period may in some instances be related to the time period during which the driver will be provided with the probationary safe driving incentive (e.g., the driver may maintain the probationary safe driving incentive if he achieves the safe driving goal within the time period).

The server 304 may provide (322) the feedback to the candidate driver, e.g., by transmitting the feedback to the mobile device and/or onboard computer 302 associated with the candidate driver, where a notification and/or other suitable message may be displayed indicating the feedback to the candidate driver. In some instances, the server 304 may provide (322) the feedback to the candidate driver periodically (e.g., hourly, daily, weekly, etc.) over a period of time. During and/or after this period of time, the server 304 may request (324) updated vehicle telematics data from the mobile device and/or on-board computer 302 associated with the candidate driver. The mobile device and/or on-board computer 302 may in turn capture (326) updated vehicle telematics data (e.g., using sensors such as sensors 118, 120, 122 as shown in FIG. 1), and transmit (328) the updated vehicle telematics data to the server 304.

The server 304 may evaluate (330) the extent to which the candidate driver has improved his or her high risk driving behaviors. In some instances, the server 304 may evaluate any improvements generally (e.g., by analyzing how many of the driver's high risk driving behaviors have improved, and how much each of the driver's high risk driving behaviors have improved). Additionally, the server 304 may evaluate improvements based on whether or not the driver has completed any indicated driving behavior modification courses (e.g., during a certain period of time). In other instances, the server 304 may evaluate driver improvements based on safe driving goals or objectives included in the driver feedback (322) (e.g., by evaluating whether a driver has achieved and/or completed a safe driving goal and/or objective, or by evaluating the extent to which a driver missed achieving and/or completing the safe driving goal and/or objective). In still other instances, the server 304 may evaluate driver improvements compared to the improvements of other similarly situated drivers (e.g., by evaluating whether the driver improved more or less than other drivers over a similar time period).

Based on the evaluation, the server 304 may modify or maintain (332) the probationary safe driving incentive. For instance, if the candidate driver has improved his or her high risk driving behaviors (e.g., generally, or as indicated by goals achieved, or compared to other drivers, etc.), the probationary safe driving incentive may be maintained, while if the driver has not improved his or her high risk driving behaviors, the probationary safe driving incentive may be modified. In some instances, the probationary safe driving incentive may be modified based on the extent of improvements.

The server 304 may provide (334) the modified or maintained probationary safe driving incentive to the candidate driver, e.g., by transmitting the probationary safe driving incentive to the mobile device and/or onboard computer 302 associated with the driver, where a notification and/or other suitable message may be displayed indicating the probationary safe driving incentive to the candidate driver.

Figure 4:
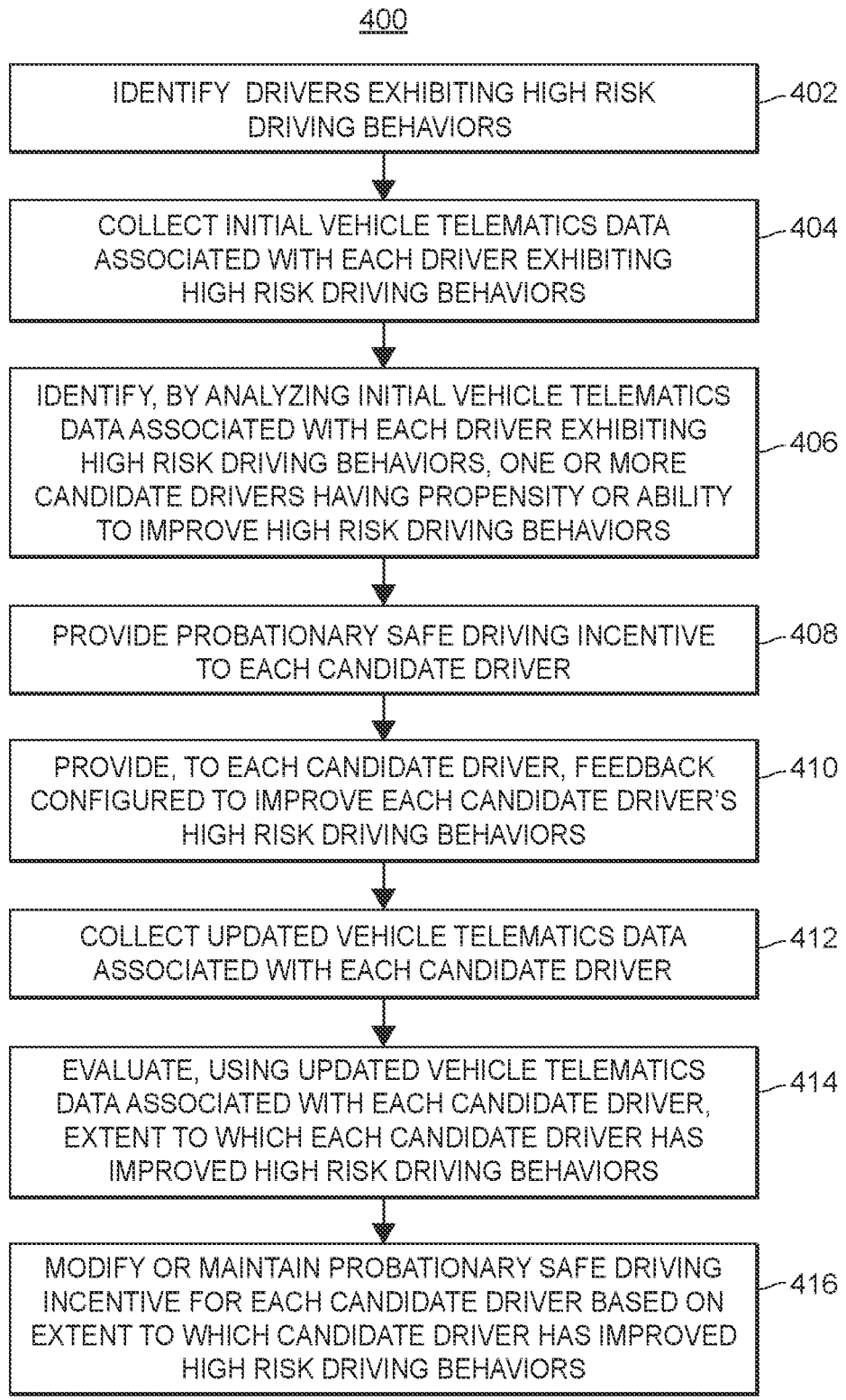
FIG. 4 depicts an exemplary method for providing an aspirational safe driving incentive to candidate drivers having a propensity or ability to improve their high risk driving behaviors.

FIG. 4 depicts an exemplary method 400 for providing an aspirational safe driving incentive to candidate drivers having the propensity or ability to improve high risk driving behaviors. The method 400 may be implemented by a computing system, such as, e.g., the server 114 of FIG. 1.

In the method 400, a plurality of drivers exhibiting high risk driving behaviors may be identified (block 402). In some instances, identifying the plurality of drivers exhibiting high risk driving behaviors may be based on an analysis of vehicle telematics data associated with each of the plurality of drivers. Additionally or alternatively, identifying the plurality of drivers exhibiting high risk driving behaviors may be based on an analysis of driving records associated with each of the plurality of drivers.

Initial vehicle telematics data associated with each driver exhibiting high risk driving behaviors may be collected (block 404). The initial vehicle telematics data may be captured by sensors (e.g., sensors 118, 120, 122 as shown in FIG. 1) disposed at vehicles (e.g., vehicles 102, 104, 106 as shown in FIG. 1) associated with each of the plurality of drivers, and may include, for example, data related to one or more driving behaviors, such as driving speed, driving acceleration, braking, cornering, and/or following distance. In some instances, the initial vehicle telematics data may be the same vehicle telematics data used at block 402 to identify the plurality of drivers exhibiting high risk driving behaviors. In other instances, however, they may be two separate (or partially overlapping) sets of vehicle telematics data.

One or more candidate drivers having the propensity or ability to improve high risk driving behaviors may be identified, e.g., by analyzing the initial vehicle telematics data associated with each driver exhibiting high risk driving behaviors (block 406). For instance, identifying a candidate driver may be based on whether the vehicle telematics data associated with that driver indicates consistent driving behaviors. Consistent driving behaviors may be driving behaviors that a particular driver engages in very frequently (e.g., during a large number of drives, during the majority of drives, etc.), as indicated by the vehicle telematics data. For example, consistently driving ten miles per hour over posted speed limits may be a consistent high risk driving behavior. Some additional examples of consistent high risk driving behaviors may include, e.g., consistently accelerating at a certain high rate, consistently cornering sharply, consistently applying excess pressure when braking, consistently maintaining too short of a following distance, etc. As another example, consistent high risk driving behaviors may be certain high risk driving behaviors in which a particular driver consistently engages as a response to certain conditions, e.g., applying excess pressure when braking (e.g., as detected based on data from operational systems of the vehicle) during rainy weather (e.g., as detected based data from a camera in the vehicle). In some instances, consistent high risk driving behaviors may be contrasted with inconsistent and/or erratic high risk driving behaviors, such as, e.g., sometimes driving twenty miles per hour above the posted speed limit but sometimes driving twenty miles per hour below the posted speed limit (both of which may be high risk driving behaviors).

In some instances, identifying the one or more candidate drivers may additionally or alternatively be based on the results of one or more personality tests, assessments, surveys, or questionnaires provided to each of the plurality of drivers exhibiting high risk driving behaviors. For instance, a personality test, assessment, surveys, or questionnaire may be designed to evaluate a driver's personality, and/or a driver's propensity or ability to make behavioral changes generally. Additionally or alternatively, an assessment may be designed to evaluate a driver's understanding of driving rules, and/or a driver's understanding of high risk driving behaviors.

A probationary safe driving incentive may be provided to each candidate driver (block 408). In some instances, the probationary safe driving incentive may be an insurance discount (e.g., for an existing customer), or low introductory rate on insurance (e.g., for a new customer). In other embodiments, the probationary safe driving incentive may be, e.g., an award or prize provided to candidate drivers, a rewards program into which candidate drivers may be enrolled, or any other suitable incentive for safe driving.

Feedback may be provided to each candidate driver to improve each candidate driver's high risk driving behaviors (block 410). In some instances, the feedback for a particular candidate driver may be customized based on the initial vehicle telematics data associated with that candidate driver. For instance, if the initial vehicle telematics data indicated that the driver consistently cornered too sharply, the feedback may include a recommendation that the driver corner less sharply. In some instances, the feedback may be provided in real-time and triggered by certain conditions. For example, the recommendation that the driver corner less sharply may be triggered by an indication that a turn is coming up on the driver's route (for instance, as determined by a vehicle navigation system). As another example, the feedback may indicate a driving behavior modification course to be completed by the driver. In some instances, the probationary safe driving incentive may be contingent on the completion of the driving behavior modification course (e.g., during a certain period of time).

Additionally or alternatively, the feedback for a particular candidate driver may be based on the results of one or more assessments provided to each of the plurality of drivers exhibiting high risk driving behaviors. For instance, certain types of feedback may be more effective for certain personality types, so the feedback may be based on a personality type indicated by the assessment.

Furthermore, the feedback may include one or more safe driving goals or objectives for the driver. For example, a safe driving goal or objective may be reducing the driver's average miles per hour over posted speed limits, or completing a certain training course. A safe driving goal or objective may additionally include a time period in which the goal or objective should be reached and/or completed (e.g., one week, one month, one year, etc.) The time period may in some instances be related to the time period during which the driver will be provided with the probationary safe driving incentive (e.g., the driver may maintain the probationary safe driving incentive if he achieves the safe driving goal within the time period).

Updated vehicle telematics data associated with each candidate driver may be collected (block 412). Like the initial vehicle telematics data, the updated vehicle telematics data may be captured by sensors disposed at vehicles associated with each of the plurality of drivers, and may include, for example, data related to one or more driving behaviors, such as driving speed, driving acceleration, braking, cornering, or following distance. The collection of updated vehicle telematics data at block 412 may occur after the collection of initial vehicle telematics data at block 404.

Using the updated vehicle telematics data associated with each candidate driver, the extent to which each candidate driver has improved his or her high risk driving behaviors may be evaluated (block 414). In some instances, evaluating the extent to which a candidate driver has improved his or her high risk driving behaviors may include comparing the updated vehicle telematics data associated with the candidate driver to the initial vehicle telematics data associated with the candidate driver in order to determine whether there has been a change in the high risk driving behaviors associated with the candidate driver.

Moreover, in some instances, evaluating the extent to which a candidate driver has improved his or her high risk driving behavior may include evaluating any improvements generally (e.g., by analyzing how many of the driver's high risk driving behaviors have improved, and how much each of the driver's high risk driving behaviors have improved). In other instances, evaluating the extent to which a candidate driver has improved his or her high risk driving behavior may include evaluating whether the candidate driver has completed any indicated driving behavior modification course or courses (e.g., within a certain period of time).

As another example, evaluating the extent to which a candidate driver has improved his or her high risk driving behavior may include evaluating driver improvements based on safe driving goals or objectives included in the driver feedback (e.g., by evaluating whether a driver has achieved and/or completed a safe driving goal and/or objective, or by evaluating the extent to which a driver missed achieving and/or completing the safe driving goal and/or objective). In still other instances, evaluating the extent to which a candidate driver has improved his or her high risk driving behavior may include evaluating driver improvements compared to the improvements of other similarly situated drivers (e.g., by evaluating whether the driver improved more or less than other drivers over a similar time period).

Based on the extent to which each candidate driver has improved his or her high risk driving behaviors, the probationary safe driving incentive for each candidate driver may be modified or maintained (block 416). For example, if the candidate driver has greatly improved his or her high risk driving behaviors, the probationary safe driving incentive may be maintained (or improved upon), while if the candidate driver has not made improvements to his or her high risk driving behaviors, the probationary safe driving incentive may be modified (e.g., wholly or partially removed).

With the foregoing, an insurance customer may opt-in to a rewards, insurance discount, or other type of program. After the insurance customer provides their affirmative consent, an insurance provider remote server may collect data from the customer's mobile device and/or vehicle, e.g., with the customer's permission or affirmative consent. The data collected may be related to insured assets before (and/or after) an insurance-related event, including those events discussed elsewhere herein. In return, risk averse insured persons may receive discounts or insurance cost savings related to auto and/or other types of insurance from the insurance provider.

In one aspect, the types of data discussed elsewhere herein may be collected or received by an insurance provider remote server, such as via direct or indirect wireless communication or data transmission from a mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as autos, and/or (ii) auto drivers.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

Unless a claim element is defined by reciting the word "means" and a function without the recital of any structure, it is not intended that the scope of any claim element be interpreted based upon the application of 35 U.S.C. § 112(f). The systems and methods described herein are directed to an improvement to computer functionality, and improve the functioning of conventional computers.

What is claimed:

1. A method, executed with a computer processor, comprising:
    identifying, via the computer processor and based at least in part on first data, a candidate likely to improve a particular technique indicated by the first data, wherein:
        the first data is captured by a plurality of sensors disposed at different respective vehicles over a period of time,
        each vehicle is associated with a different respective user of a plurality of users,
        the candidate is a user of the plurality of users,
        the first data comprises a first indication representing that the candidate exhibited a risky driving behavior associated with the particular technique, during the period of time, with a variability that falls below a variability threshold, and
        identifying the candidate comprises determining, based on the first indication, that the candidate is likely to improve the particular technique;
    receiving, via the computer processor and from an on-board computer disposed at a vehicle operated by the candidate, second data captured by a subset of the plurality of sensors disposed at the vehicle;
    transmitting, via the computer processor and based at least in part on the second data, a request to the on-board computer to output, in real time, feedback indicative of the particular technique, wherein outputting the feedback comprises activating a haptic feedback capability of the on-board computer;
    receiving, via the computer processor, third data captured by the subset of the plurality of sensors during or after output of the feedback;
    determining, via the computer processor and based on the third data, an improvement in the particular technique; and
    providing, via the computer processor and based on the improvement, a message to the candidate.

2. The method of claim 1, wherein the feedback:
    is generated based at least in part on personality characteristics of the candidate, and
    comprises of at least one of haptic feedback, audible feedback, or visible feedback.

3. The method of claim 1, wherein the candidate is identified based on information received from at least one of a GPS sensor, an accelerometer, a speedometer, a brake sensor, and an image sensor.

4. The method of claim 1, wherein the candidate is identified based on information indicative of one or more accidents or tickets.

5. The method of claim 1, wherein the candidate is identified based on at least one of: (i) performing the particular technique by more or less than at least a minimum amount, (ii) performing the particular technique at a substantially consistent rate, (iii) performing the particular technique at a substantially consistent angle, (iv) a following distance, or (vi) results of one or more personality tests, assessments, surveys, or questionnaires.

6. The method of claim 1, further comprising:
    prior to causing the vehicle to output the feedback, generating the feedback based on a portion of the first data associated with the candidate.

7. The method of claim 1, wherein determining the improvement in the particular technique comprises:
    determining a change in one or both of (i) a frequency, or (ii) a number, of behaviors associated with the candidate.

8. A computer system, comprising:
    plurality of sensors disposed at different respective vehicles associated with a plurality of users and configured to capture first data associated with the plurality of users;
    one or more processors; and
    one or more memories storing instructions that, when executed by the one or more processors, cause the computer system to:
        identify, by the one or more processors and based at least in part on the first data, a candidate likely to improve a particular technique indicated by the first data, wherein:
            the first data is captured by the plurality of sensors disposed at the different respective vehicles over a period of time, each vehicle is associated with a different respective user of a plurality of users, the candidate is a user of the plurality of users, the first data comprises a first indication representing that the candidate exhibited a risky driving behavior associated with the particular technique, during the period of time, with a variability that falls below a variability threshold, and identifying the candidate comprises determining, based on the first indication, that the candidate is likely to improve the particular technique;

receive, from an on-board computer disposed at a vehicle operated by the candidate, second data captured buy by a subset of the plurality of sensors disposed at the vehicle operated by the candidate;

transmitting, by the one or more processors and based at least in part on the second data, a request to the on-board computer to output, in real time, feedback indicative of the particular technique, wherein outputting the feedback comprises activating a haptic feedback capability of the on-board computer;

capture, by the subset of the plurality of sensors during or after output of the feedback, third data;

determine, by the one or more processors and based on the third data, an improvement in the particular technique; and provide, by the one or more processors and based on the improvement, a message to the candidate.

9. The computer system of claim 8, wherein the first data and the second data each comprise data relating to at least one of:

speed, acceleration, braking, cornering, or following distance.

10. The computer system of claim 8, wherein the instructions cause the computer system to identify the candidate based on information associated with operation of a vehicle.

11. The computer system of claim 8, wherein the instructions cause the computer system to identify the candidate based on information indicating a use of at least one of a mobile phone, a smart watch, or an on-board computer.

12. The computer system of claim 8, wherein the candidate is identified based at least in part on information indicative of performing the particular technique by an amount greater than a threshold amount.

13. The computer system of claim 8, wherein, the instructions further cause the computer system to, prior to causing the vehicle to output the feedback, generate the feedback based on a portion of the first data associated with the candidate, and wherein the feedback comprises of at least one of haptic feedback, audible feedback, or visible feedback.

14. The computer system of claim 8, wherein the instructions that cause the computer system to determine the improvement in the particular technique further comprise instructions that cause the computer system to:

determine a change in one or both of (i) a frequency, or (ii) a number, of behavior associated with the candidate.

15. One or more non-transitory computer readable media storing instructions that, when executed, cause a computer processor to perform acts comprising:

identifying, via the computer processor and based at least in part on first data, a candidate likely to improve a particular technique indicated by the first data, wherein:

the first data is captured by a plurality of sensors disposed at different respective vehicles over a period of time, each vehicle is associated with a different respective user of a plurality of users, the candidate is a user of the plurality of users, the first data comprises a first indication representing that the candidate exhibited a risky driving behavior associated with the particular technique, during the period of time, with a variability that falls below a variability threshold, and identifying the candidate comprises determining, based on the first indication, that the candidate is likely to improve the particular technique;

receiving, via the computer processor and from an on-board computer disposed at a vehicle operated by the candidate, second data captured by a subset of the plurality of sensors disposed at the vehicle;

transmitting, via the computer processor and based at least in part on the second data, a request to the on-board computer to output, in real time, feedback indicative of the particular technique, wherein outputting the feedback comprises activating a haptic feedback capability of the on-board computer;

receiving, via the computer processor, third data captured by the subset of the plurality of sensors during or after output of the feedback;

determining, via the computer processor and based on the third data, an improvement in the particular technique; and providing, via the computer processor and based on the improvement, a message to the candidate.

16. The one or more non-transitory computer readable media of claim 15, wherein prior to causing the vehicle to output the feedback, generate the feedback based on a portion of the first data associated with the candidate, and wherein the feedback comprises of at least one of haptic feedback, audible feedback, or visible feedback.

17. The one or more non-transitory computer readable media of claim 15, wherein the message comprises a percentage discount reduction associated with a base policy cost.

18. The one or more non-transitory computer readable media of claim 15, wherein the feedback associated with the particular technique comprises training instructions associated with improving the particular technique.

19. The one or more non-transitory computer readable media of claim 15, wherein identifying the candidate comprises identifying the particular technique being performed by the candidate during rainy weather.

20. The one or more non-transitory computer readable media of claim 15, the acts further comprising:

prior to causing the vehicle to output the feedback, generating the feedback based on a portion of the first data associated with the candidate.

21. The method of claim 1, wherein identifying the candidate comprises:

receiving additional information indicative of an assessment provided to the candidate, the assessment being indicative of a past driving behavior of the candidate during a past period of time prior to the period of time; and determining that the candidate is likely to improve the particular technique based on the additional information.

* * * * *